US011930727B1

(12) United States Patent
Magarin

(10) Patent No.: US 11,930,727 B1
(45) Date of Patent: Mar. 19, 2024

(54) ADJUSTABLE ROW CROP CULTIVATOR

(71) Applicant: Brian N. Magarin, Holstein, NE (US)

(72) Inventor: Brian N. Magarin, Holstein, NE (US)

( * ) Notice: Subject to any disclaimer, the term of this patent is extended or adjusted under 35 U.S.C. 154(b) by 391 days.

(21) Appl. No.: 17/320,535

(22) Filed: May 14, 2021

(51) Int. Cl.
*A01B 39/08* (2006.01)
*A01B 39/24* (2006.01)
*A01B 63/32* (2006.01)

(52) U.S. Cl.
CPC .............. *A01B 39/08* (2013.01); *A01B 39/24* (2013.01); *A01B 63/32* (2013.01)

(58) Field of Classification Search
CPC ......... A01B 39/08; A01B 39/00; A01B 39/02; A01B 39/085; A01B 39/10; A01B 39/16; A01B 39/163; A01B 39/18; A01B 39/19; A01B 39/24; A01B 39/26; A01B 63/32
See application file for complete search history.

(56) References Cited

U.S. PATENT DOCUMENTS 3,220,488 A * 11/1965 Becker ................... A01B 39/08 172/551
3,331,449 A * 7/1967 Blocker ................. A01B 39/08 172/159
3,554,297 A * 1/1971 Lehman ............... A01B 63/245 172/624.5
3,608,642 A * 9/1971 Culp ...................... A01B 19/06 172/62
3,744,571 A * 7/1973 Nichols .................. A01B 35/32 172/810
4,426,940 A * 1/1984 Brain ..................... A01B 35/12 172/619
4,506,610 A * 3/1985 Neal ...................... A01B 39/08 111/139
4,579,179 A * 4/1986 Vachon .................. A01B 39/24 172/395
4,585,073 A * 4/1986 Mayeda ................. A01B 39/14 172/158
4,660,653 A * 4/1987 Mayeda ................. A01B 39/14 172/522

(Continued)

FOREIGN PATENT DOCUMENTS

CN 113678587 A * 11/2021
DE 102021103040 A1 * 8/2022
EP 3152991 A1 * 4/2017 ............. A01B 39/08

(Continued)

*Primary Examiner* — Adam J Behrens
*Assistant Examiner* — Blake E Scoville
(74) *Attorney, Agent, or Firm* — Suiter Swantz PC LLO

(57) ABSTRACT

An adjustable row crop cultivator is mounted on a tool bar which is vertically movably mounted at the rear end of a tractor. The cultivator includes a plurality of spaced-apart adjustable cultivator units which are vertically movably mounted on the tool bar. A gauge wheel assembly is selectively vertically movably mounted at the forward end of each of the cultivator units. A first mounting plate is positioned at one side of the cultivator unit and has cultivator tools mounted thereon. A second mounting plate is positioned at the other side of the cultivator unit and has cultivator tools mounted thereon. The first and second mounting plates are horizontally movably mounted so that they may be moved towards one another and moved away from one another. The cultivator units may be adjusted by the operator of the tractor from the tractor while the tractor is moving.

6 Claims, 8 Drawing Sheets

(56) References Cited

U.S. PATENT DOCUMENTS 4,785,890 A * 11/1988 Martin .................. A01C 7/006
111/139

FOREIGN PATENT DOCUMENTS

| | | | | | |
|---|---|---|---|---|---|
| ES | 2387283 | A1 * | 9/2012 | ............. | A01B 39/16 |
| ES | 1111380 | U * | 6/2014 | ............. | A01B 19/00 |
| FR | 57056 | E * | 10/1952 | ............. | A01B 39/16 |
| FR | 3023448 | A1 * | 1/2016 | ............. | A01B 39/16 |
| WO | WO-0056136 | A1 * | 9/2000 | ............. | A01B 39/02 |

* cited by examiner

ADJUSTABLE ROW CROP CULTIVATOR

BACKGROUND OF THE INVENTION

Field of the Invention

This invention relates to an adjustable row crop cultivator designed to be pulled by a tractor. More importantly, the invention relates to a row crop cultivator having a plurality of horizontally spaced-apart adjustable cultivator row units which are longitudinally adjustably secured to a horizontally disposed tool bar. Even more importantly, the invention relates to an adjustable row crop cultivator which may be easily adjusted from the tractor while the tractor is pulling the cultivator through the row crop field.

Description of the Related Art

Prior art cultivators were adjusted with wrenches who only had to adjust the cultivator to handle 6-12 rows. The time to adjust a 6-12 row cultivator in 1990 was about 5-10 minutes. Today, a 12-24 row cultivator that is being adjusted can take 30-45 minutes. Further, prior art cultivator row units were centered between the rows which is fine for a small rigid tool bar and non-rolling terrain. Today, most row crop planters have flexible toolbars so that they can map and follow the ground and place the seed in the ground perfectly. This creates a "pinch row" or a slightly narrower row at each of the flex points in the toolbar. When a "pinched row" is later cultivated with a row unit, which is centered in the middle of the "pinched row", that cultivator row unit isn't able to be set at its maximum width since that row width will widen and narrow through the field and hills which also affects every row unit that is beyond the flex point.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An adjustable row crop cultivator is configured to be secured to a horizontally disposed tool bar which is pulled through a row crop field by a tractor or other suitable vehicle. A plurality of adjustable row crop cultivator units are selectively longitudinally mounted on the tool bar by clamps. Each of the cultivator units includes an upstanding first support having an upper end, a lower end, a forward end, a rearward end, a first side and a second side. The upstanding first support includes first and second vertically disposed support members which are horizontally spaced-apart. The upstanding first support is pivotally secured to a clamp on the tool bar by first and second elongated arms. A first hydraulic cylinder extends between the upstanding first support and the associated clamp on the tool bar for raising and lowering the cultivator unit with respect to the tool bar.

A horizontally disposed cross-tube having first and second ends is vertically movably positioned at the lower end of the upstanding support. First and second gauge wheels are adjustably secured to the first and second ends of the cross-tube. A second hydraulic cylinder is positioned between the first and second support members for raising and lowering the cross-tube and the gauge wheels. An elongated and horizontally disposed second support, having forward and rearward ends, extends rearwardly from the first and second support members. A vertically disposed third support, having upper and lower ends, extends downwardly from the second support at the rearward end of the second support. A vertically disposed first mounting plate, having forward and rearward ends, is positioned at one side of the second support and a vertically disposed second mounting plate, having forward and rearward ends, is positioned at the other side of the second support. Cultivator tools are secured to the first and second mounting plates.

A first pair of parallel arms pivotally connect the lower end of the first support and the forward end of the first mounting plate and extend outwardly and rearwardly from the first support. A second pair of parallel arms pivotally connect the lower end of the first support and the forward end of the second mounting plate and extend outwardly and rearwardly from the first support. A third pair of parallel arms pivotally connect the lower end of the third support and the rearward end of the first mounting plate and extend outwardly and rearwardly from the third support. The first pair of parallel arms and the third pair of parallel arms are parallel to one another. A fourth pair of parallel arms pivotally connect the lower end of the third support and the rearward end of the second mounting plate. The second pair of parallel arms and the fourth pair of parallel arms are parallel to one another.

A third hydraulic cylinder is positioned below the second support and is pivotally connected to the first mounting plate by an elongated first link arm and is pivotally connected to the second mounting plate by an elongated second link arm. The third hydraulic cylinder is configured to pivotally move the first and second mounting plates between inner and outer positions with respect to the second support and so that the cultivator tools on the first and second mounting plates may be moved between inner and outer positions with respect to the second support. The hydraulic cylinders are remotely controlled by the operator of the tractor from the tractor.

It is therefore a principal object of the invention to provide an adjustable row crop cultivator which may be remotely adjusted from the tractor which is pulling the cultivator through a row crop field.

A further object of the invention is to provide an adjustable row crop cultivator wherein the cultivator tools at one side of the cultivator may be moved towards on another or moved away from one another by the operator of the tractor, from the tractor, which is pulling the cultivator through the row crop field.

A further object of the invention is to provide a cultivator unit of an adjustable cultivator wherein the gauge wheel assembly thereon may be vertically adjusted by the operator of the tractor, from the tractor, which is pulling the cultivator through the row crop field.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
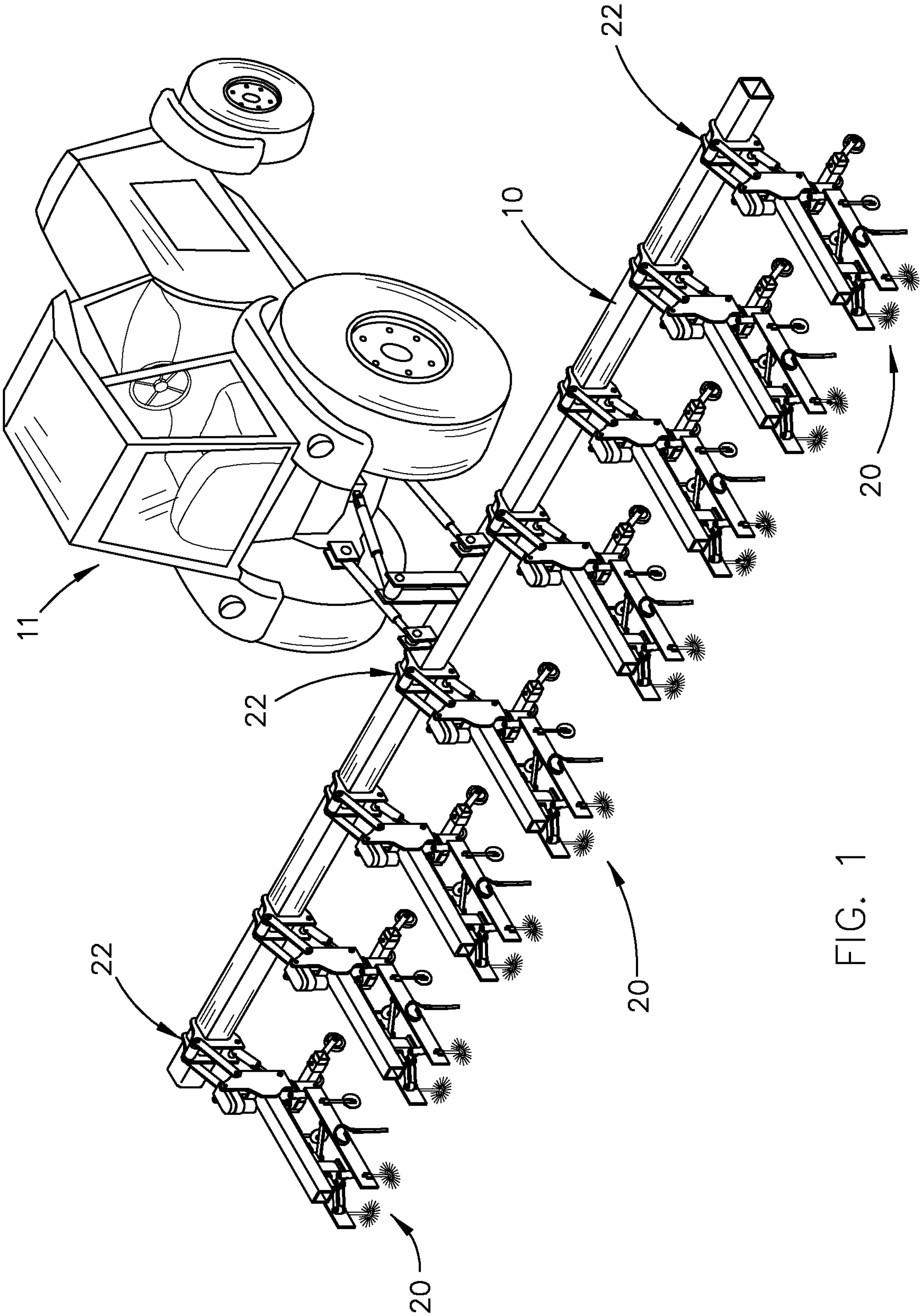
FIG. 1 is a rear perspective view of the adjustable row crop cultivator of this invention being pulled by a tractor.
Figure 2:
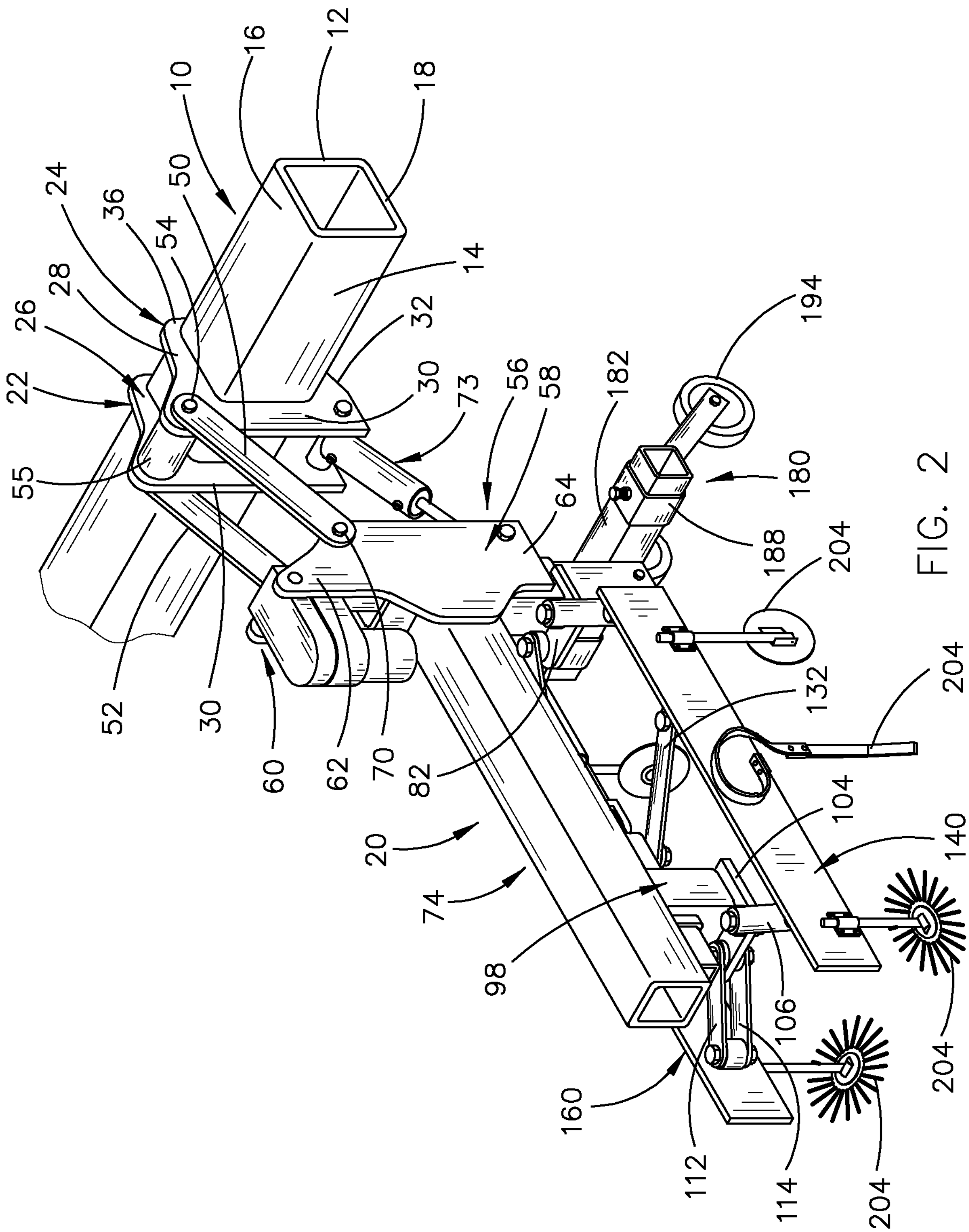
FIG. 2 is a rear perspective view of the adjustable row crop cultivator unit of this invention.
Figure 3:
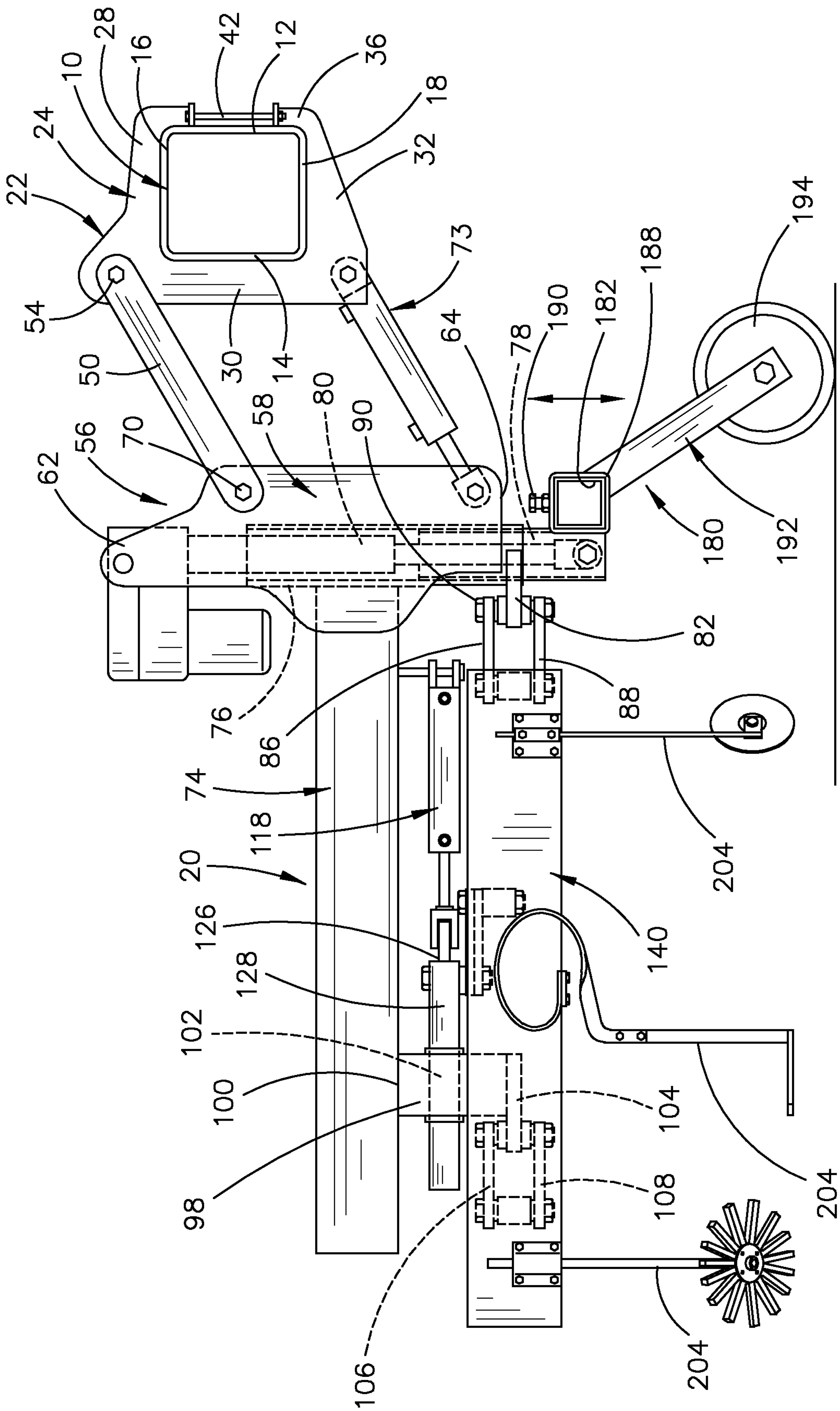
FIG. 3 is a side elevational view of the adjustable row crop cultivator unit of this invention.
Figure 4:
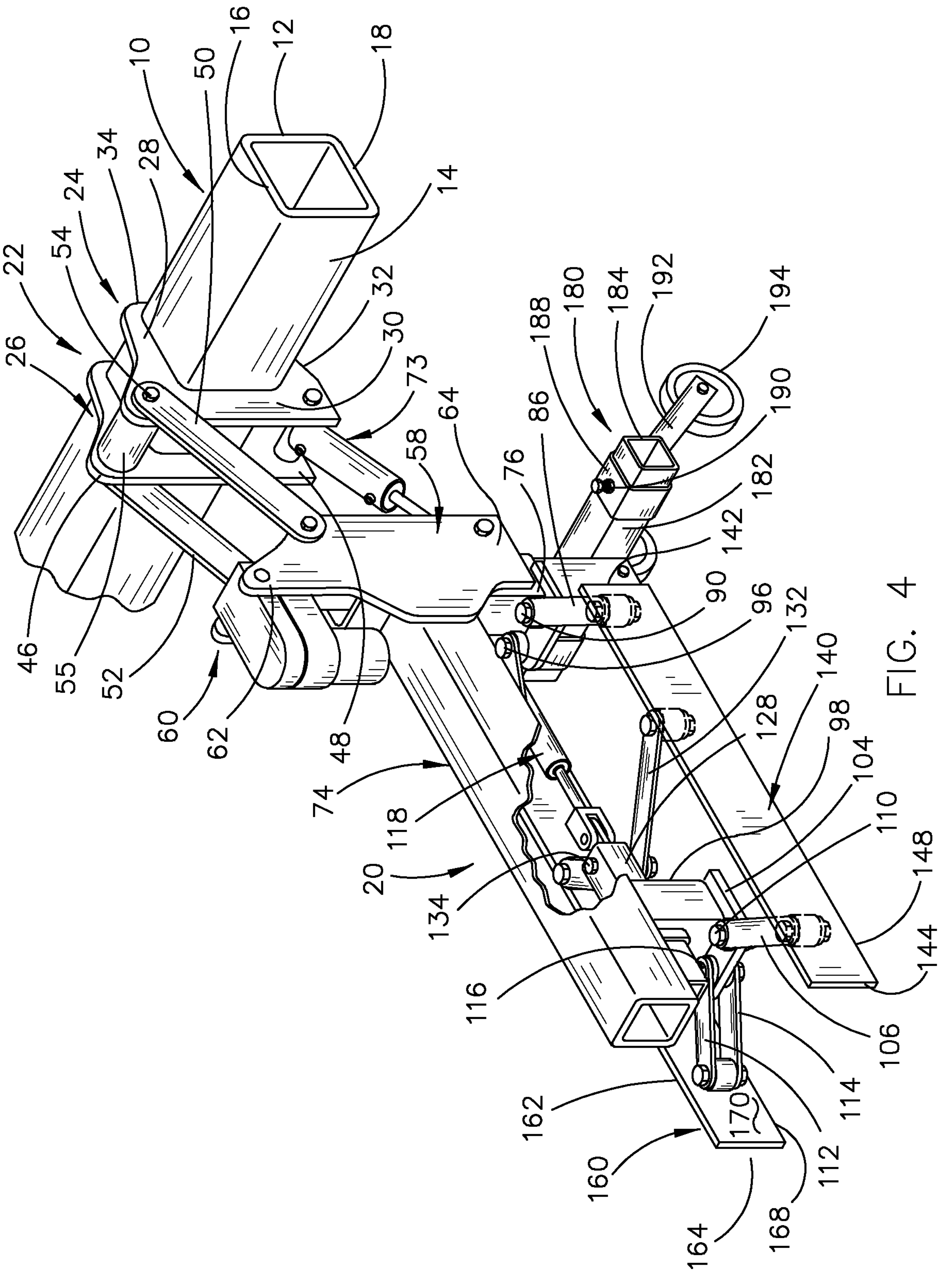
FIG. 4 is an upper rear perspective and elevational view of the adjustable row crop cultivator unit of this invention with a portion thereof cut-away to more fully illustrate the invention.
Figure 5:
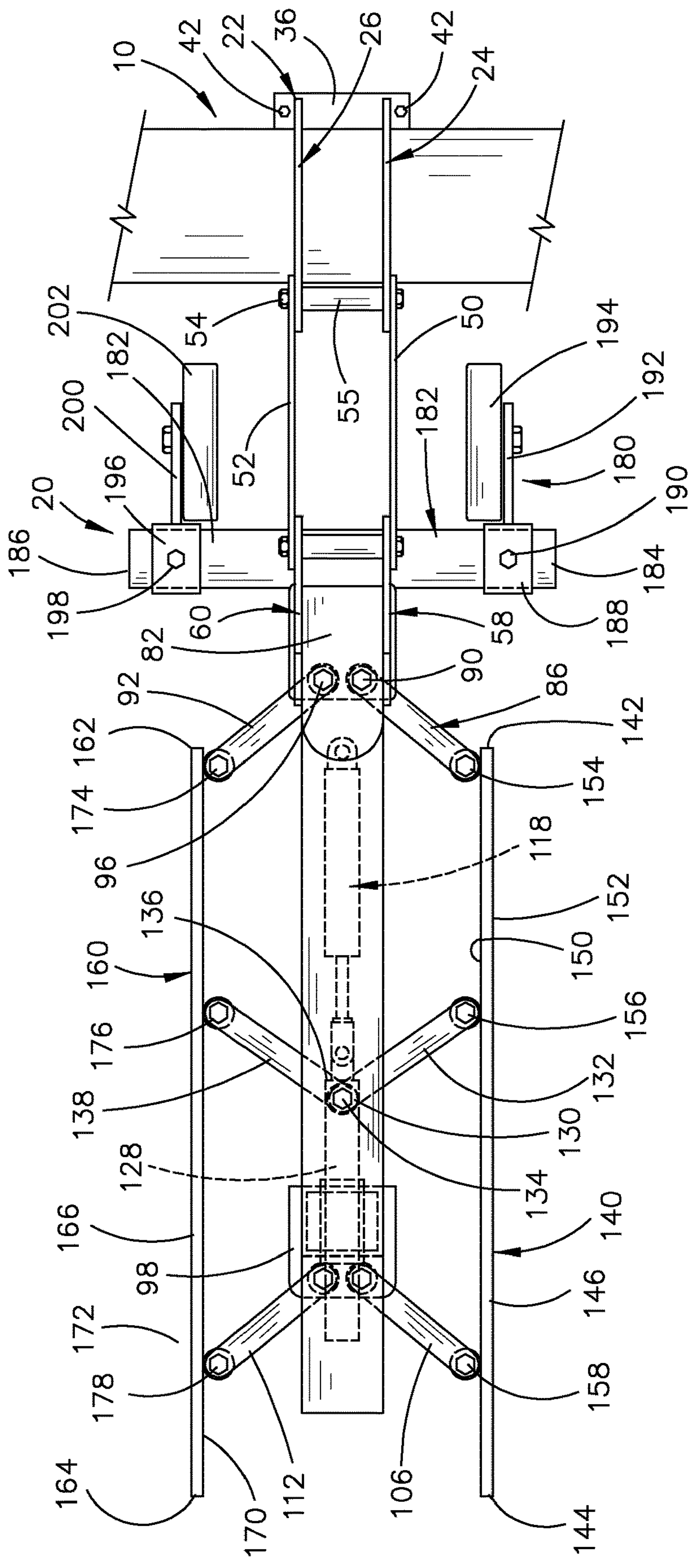
FIG. 5 is an upper elevational view of the adjustable row crop cultivator unit of this invention.
Figure 6:
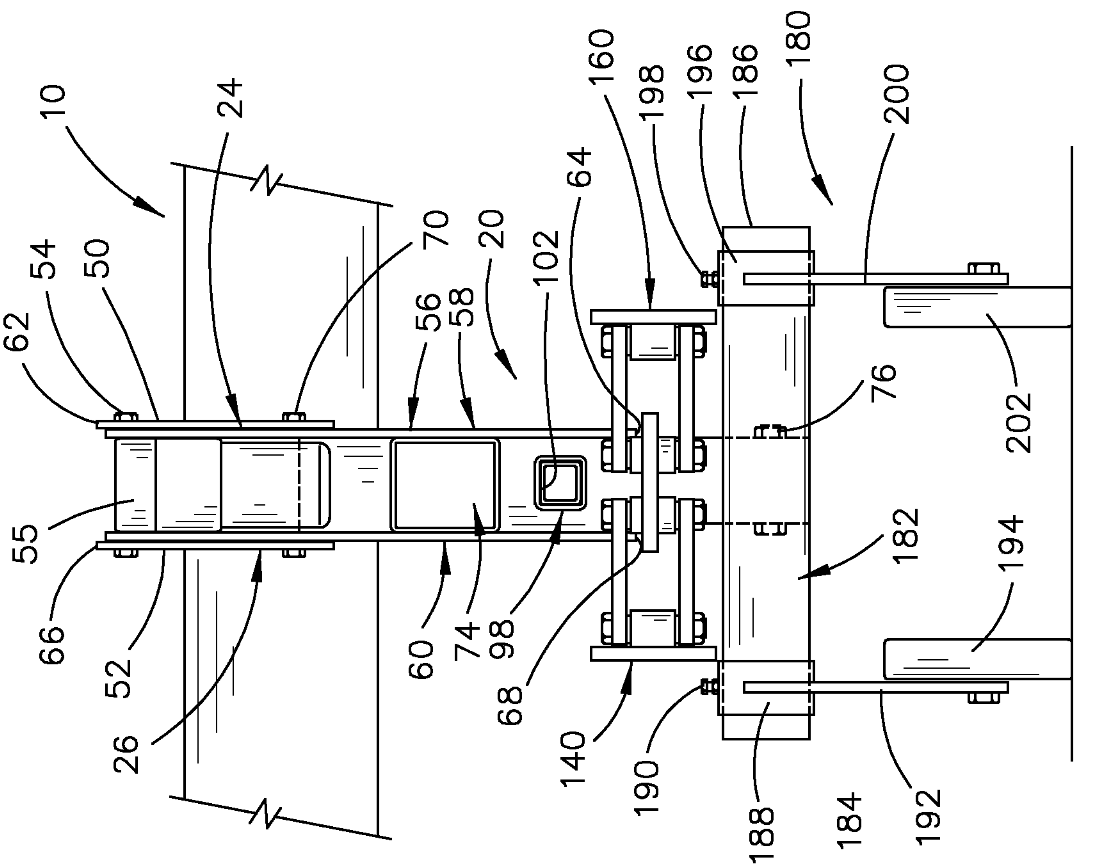
FIG. 6 is a front elevational view of the adjustable row crop cultivator unit of this invention with the gauge wheels thereof being in a ground engaging position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to an elongated tool bar of conventional design. Tool bar 10 is usually connected to the three-point hitch of a tractor 11 whereby the tool bar 10 may be raised or lowered. The length of the tool bar 10 will vary depending on the number of row crop cultivator units which are mounted thereon. Tool bar 10 will be described as having a front side 12, a rear side 14, an upper side 16 and a lower side 18.

The numeral 20 refers to the adjustable row crop cultivator units of this invention. Each of the row crop cultivator units 20 includes a clamp 22 having spaced-apart clamp members 24 and 26 which are clamped onto the tool bar 10. Clamp member 24 includes an upper clamp portion 28, a rear clamp portion 30 and a lower clamp portion 32. Clamp member 24 also includes an upper forward clamp portion 34 which extends downwardly from the forward end of clamp portion 28. A plate 36 is secured to the lower end of clamp portion 34. Clamp member 24 also includes a lower forward clamp portion 38 which extends upwardly from the forward end of clamp portion 32. A plate 40 is secured to the upper end of clamp portion 38. A pair of bolts 42 extend downwardly through plates 36 and 40 and have a nut 44 mounted on the lower end thereof to clamp the clamp member 24 onto tool bar 10. Clamp member 26 is spaced from clamp member 24 and is identical to clamp member 24 and will not be described in detail except for stating that the rear clamp portion of clamp member 26 has an upper end 46 and a lower end 48.

Figure 7:
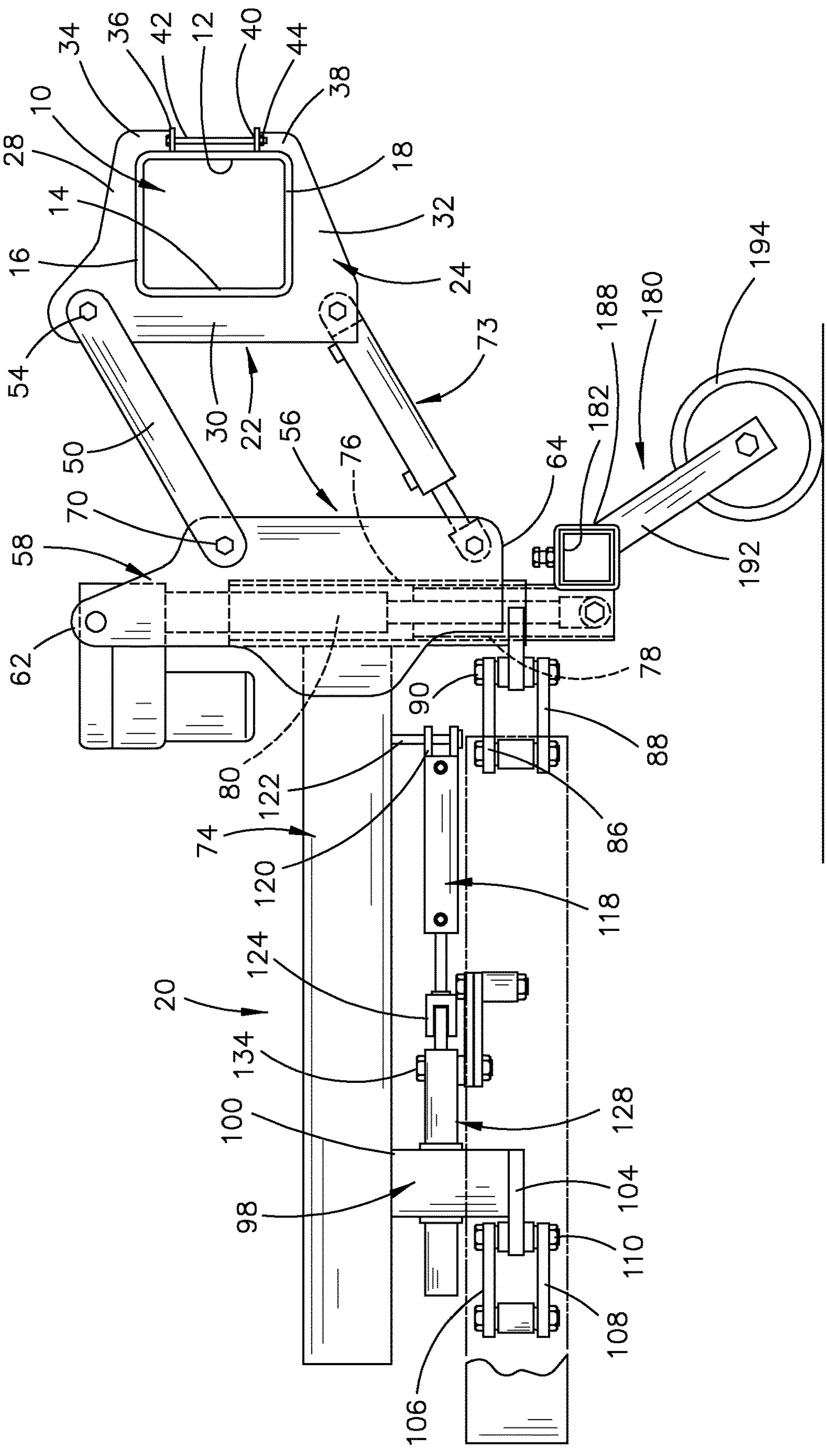
FIG. 7 is a side elevational view of the adjustable row crop cultivator unit of this invention with the gauge wheels thereof being in a ground engaging position.
Figure 8:
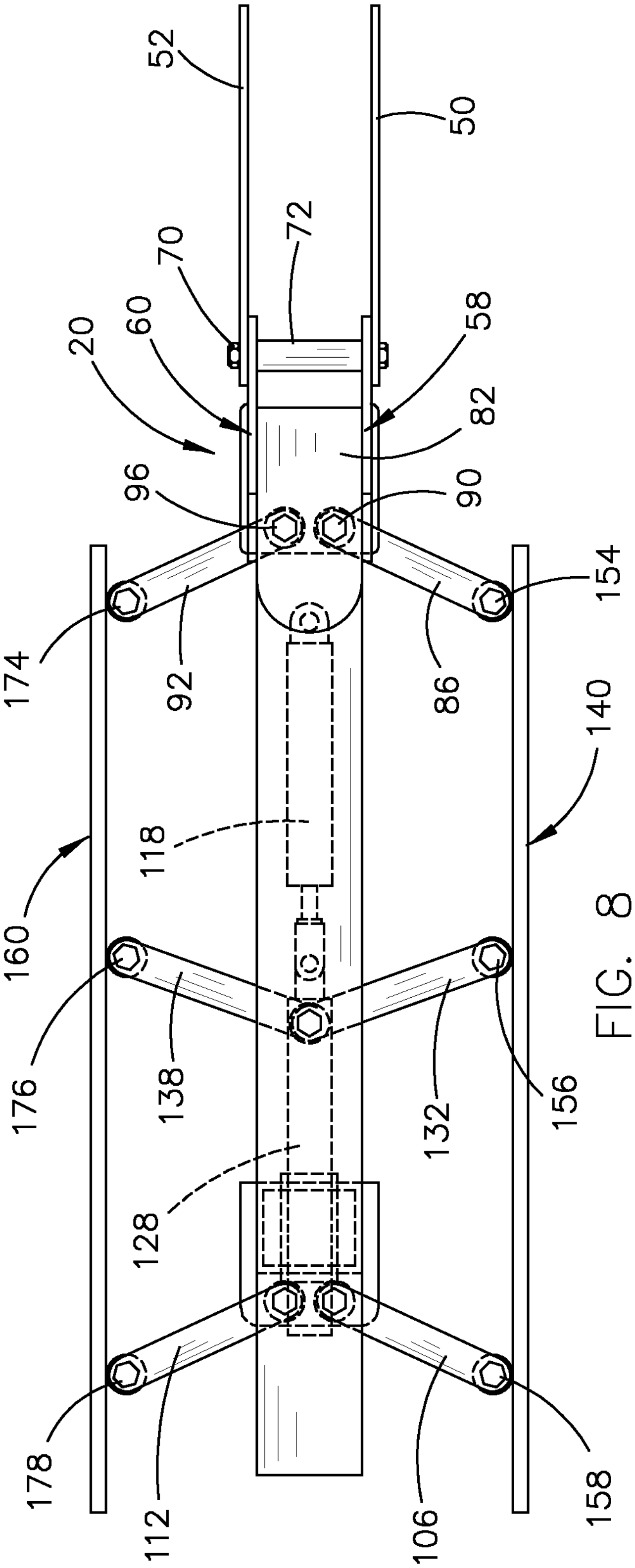
FIG. 8 is a partial upper elevational view of the apparatus for supporting the cultivator tools with the tool mounting plates being in their outer position.
Figure 9:
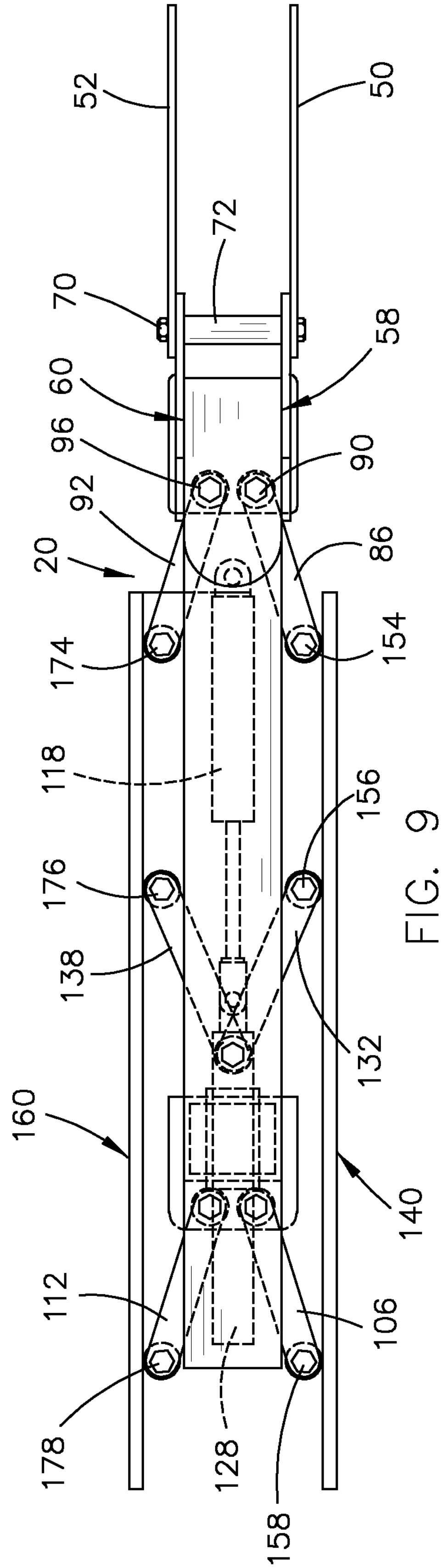
FIG. 9 is a view similar to FIG. 8 except that the cultivator tool mounting plates are in their inner position.

A pair of parallel arms 50 and 52 have their forward ends pivotally secured to the rear ends of clamp members 24 and 26 respectively by a pivot bolt 54 and a tube 55 having bearings therein. The numeral 56 refers to an upstanding support which includes horizontally spaced-apart support members 58 and 60. Support member 58 includes an upper end 62 and a lower end 64. Support member 60 includes an upper end 66 and a lower end 68. The forward ends of support members 58 and 60 are pivotally secured to the rear ends of parallel arms 50 and 52 by a bolt 70 which extends through a bushing 72 positioned between the forward ends of support members 58 and 60. The forward end of hydraulic cylinder 73 extends between the lower clamp portion 32 of clamp member 24 and the lower clamp portion 48 of clamp member 26 and is secured thereto by a pin. The rod end of hydraulic cylinder 73 is pivotally connected to support members 58 and 60 by a pin. Hydraulic cylinder 73 is controlled by the operator of the tractor 11 so that it may be controlled while the tractor 11 is moving. Support 56 has the forward end of an elongated and horizontally disposed tube 74 which is positioned between support members 58 and 60 and which is welded thereto. A vertically disposed hollow tube 76 is positioned between the support members 58 and 60 and is welded thereto. A vertically disposed tube 78 is vertically slidably movably mounted in the tube 76 and is vertically movable by means of a hydraulic cylinder or electric actuator 80 positioned in tube 76 above tube 78. The upper end of the hydraulic cylinder or electric actuator 80 is secured to the upper ends of support members 58 and 60 by a pin as seen in FIG. 7. Hydraulic cylinder or electric actuator 80 is controlled by the operator of the tractor 11 so that it may be controlled while the tractor 11 is moving. A plate 82 is welded to the tube 78 above the lower end of tube 78. As will be described hereinafter, a gauge wheel assembly is secured to the lower end of tube 78 for vertical movement therewith.

A pair of vertically spaced-apart parallel arms 86 and 88 have their inner forward ends pivotally secured to plate 82 by a pivot bolt 90. As seen, the parallel arms 86 and 88 extend rearwardly and outwardly from plate 82. A pair of vertically spaced-apart parallel arms 92 and 94 (not shown) have their inner forward ends pivotally secured to plate 82 by a pivot bolt 96. As seen, the parallel arms 92 and 94 extend rearwardly and outwardly from plate 82.

A support 98 has its upper end 100 welded to the lower side of tube 74 forwardly of the rear end of tube 74. Support 98 has a horizontally disposed square tube opening 102 extending therethrough from its forward end to its rearward end. A plate 104 is welded to the lower end of support 98. A pair of parallel arms 106 and 108 have their inner forward ends pivotally secured to plate 104 by a pivot bolt 110. As seen, the parallel arms 106 and 108 extend rearwardly and outwardly from plate 104. A pair of parallel arms 112 and 114 have their inner forward ends pivotally secured to plate 104 by pivot bolt 116. As seen, the parallel arms 112 and 114 extend rearwardly and outwardly from plate 104. It should be noted that arms 86 and 88 are parallel to arms 106 and 108 respectively. It should also be noted that arms 92 and 94 are parallel to arms 112 and 114 respectively.

The numeral 118 refers to a hydraulic cylinder or electric actuator which is positioned below tube 74. The base end 120 of cylinder or actuator 118 is secured to tube 74 by a bolt 122. The rod end 124 is secured to the forward end 126 of an elongated tube 128. As seen, tube 128 is slidably mounted in square opening 102 in support 98. The inner end 130 of a link arm 132 is pivotally secured to the forward end of tube 128 by bolt 134. The inner end 136 of a link arm 138 is pivotally secured to the forward end of tube 128 by bolt 134. As seen, the link arms 132 and 138 extend forwardly and outwardly from tube 128.

The numeral 140 refers to a vertically disposed and rectangular mounting plate having a forward end 142, a rearward end 144, an upper end 146, a lower end 148, an inner side 150 and an outer side 152. The outer ends of arms 86 and 88 are pivotally secured to mounting plate 140 by pivot bolt 154 at the inner forward end of mounting plate 140. The outer end of link arm 132 is pivotally secured to the inner side of mounting plate 140 by a pivot bolt 156. The outer ends of arms 106 and 108 are pivotally secured to the inner rearward end of mounting plate 140 by pivot bolt 158.

The numeral 160 refers to a vertically disposed and rectangular mounting plate having a forward end 162, a rearward end 164, an upper end 166, a lower end 168, an inner side 170 and an outer side 172. The outer ends of arms 92 and 94 are pivotally secured to the inner side of mounting plate 160 by a pivot bolt 174 at the forward end 162 of mounting plate 160. The outer end of link arm 138 is pivotally secured to the inner side of mounting plate 160 by a pivot bolt 176. The outer ends of arms 112 and 114 are pivotally secured to the inner rearward end of mounting plate 160 by a pivot bolt 178.

The adjustable row cultivator 20 also includes a gauge wheel assembly 180. Gauge wheel assembly 180 includes a horizontally disposed support tube 182, having ends 184 and 186, which is secured by welding to front side of tube 76, at the lower end of tube 76, so as to extend transversely with respect thereto. A first clamping tube 188 slidably embraces tube 182 at end 184 of tube 182. Clamping tube 188 is selectively adjustably held in place on tube 182 by bolt 190. A gauge wheel support arm 192 has its upper end welded to clamping tube 188 and extends downwardly and forwardly therefrom. The lower end of arm 192 has a gauge wheel 194 rotatably mounted therein.

A second clamping tube 196 slidably embraces tube 182 at end 186. Clamping tube 196 is selectively adjustably held in place on tube 182 by bolt 198. A gauge wheel support arm 200 has its upper end welded to clamping tube 196 and extends downwardly and forwardly therefrom. The lower end of arm 200 has a gauge wheel 202 rotatably mounted thereon. The numerals 204 refer to various cultivation tools which are secured to mounting plates 140 and 160.

The use of the adjustable row crop cultivator will now be described. The operator of the tractor 11 will first remotely retract the hydraulic cylinders 73 on the cultivator units 20 and will raise the tool bar 10 so that the cultivator units 20 are positioned above the ground. The operator of the tractor will position the cultivator at the end of the crop rows to be cultivated. The tool bar 10 will then be lowered and the hydraulic cylinders 80 on the cultivator units 20 will be lowered until the gauge wheels 194 and 202 engage the ground. The hydraulic cylinders 118 on the cultivator units 20 will then be retracted until the mounting plates 140 and 160 are spaced-apart the proper distance so that the cultivator tools 204 will be aligned with the space between the crop rows.

The tractor is then driven into the end of the field. The hydraulic cylinders 73 on the cultivator units 20 and the hydraulic cylinders 80 on the cultivator units 20 will be operated so that the cultivator tools 204 properly engage the soil between the crop rows. At that time the gauge wheels 194 and 202 will be in ground engagement. The hydraulic cylinders 73 and 80 on the cultivator units 20 are adjusted to compensate for the droop of the ends of the tool bar 10 and for the terrain irregularities, if any.

Hydraulic cylinder 73 will be operated at the end of field for irregularity in the field ends "point rows". Hydraulic cylinder 73 permits the row unit to be lifted out of the ground so that it will not cultivate out the end rows of the field.

The tractor is then driven through the field and the cultivator tools 204 will cultivate the soil between the crop rows. If irregular terrain is encountered, certain of the cultivator units 20 will be remotely raised or lowered by the tractor operator to compensate for the irregularity. The tractor operator is able to remotely control the height of the cultivator units 20 from the tractor. The operator is able to change the spacing of the mounting plates 140 and 160 to compensate for "pinched" rows or the like from the tractor.

The advantages of the instant invention with respect to the prior art are as follows:

(1) The cultivator units 20 may be easily longitudinally adjusted on the tool bar 10;

(2) The cultivator units 20 may be remotely raised and lowered by the operator of the tractor 11 from the tractor 11;

(3) Individual cultivator units 20 may be raised and lowered by the operator of the tractor 11 from the tractor 11 to compensate for irregularity in the field; and (4) The spacing of the cultivator tools on the mounting plates is easily changed by the operator of the tractor 11 from the tractor 11.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:

a horizontally disposed and vertically movable tool bar having a first end, a second end, an upper side, a lower side, a forward side and a rearward side;

a plurality of horizontally spaced-apart cultivator row units secured to said tool bar;

each of said horizontally spaced-apart cultivator row units comprising:

(a) a support clamp selectively longitudinally clamped onto said tool bar with said support clamp including an upper clamp portion with forward and rearward ends, a rear clamp portion, with upper and rearward ends, extending downwardly from said rearward end of said upper clamp portion, a lower clamp portion, with forward and rearward ends, extending forwardly from said lower end of said rear clamp portion, with said forward ends of said upper and lower clamp portions being selectively joined together to clamp said support clamp onto said tool bar;

(b) first and second horizontally spaced-apart parallel arms having forward and rearward ends;

(c) said forward ends of said first and second horizontally spaced-apart parallel arms being pivotally secured, about a horizontal axis, to said rearward end of said upper clamp portion;

(d) a first hydraulic cylinder having a base end and a rod end;

(e) said base end of said first hydraulic cylinder being pivotally secured, about a horizontal axis, to said lower end of said rear clamp portion;

(f) a vertically disposed first support including horizontally spaced-apart first and second support members which have an upper end, a lower end, a forward end, a rearward end, an inner side and an outer side;

(g) said rearward end of said first parallel arm being pivotally secured, about a horizontal axis, to said forward end of said first support member at said upper end of said first support member;

(h) said rearward end of said second parallel arm being pivotally secured, about a horizontal axis, to said forward end of said second support member at said upper end of said second support member;

(i) said rod end of said first hydraulic cylinder being pivotally secured, about a horizontal axis, to said forward ends of said first and second support members at said lower ends of said first and second support member;

(j) the extension of said first hydraulic cylinder causing said vertically disposed first support to move upwardly with respect to said tool bar;

(k) the retraction of said first hydraulic cylinder causing said vertically disposed first support to move downwardly with respect to said tool bar;

(l) a vertically disposed first tube, having an upper end and a lower end, positioned between said first and second support members and being secured thereto;

(m) a vertically disposed second tube, having an upper end and a lower end, vertically slidably mounted within said first tube with said lower end of said second tube being positioned below said lower end of said first tube;

(n) a vertically disposed second hydraulic cylinder, having an upper base end and a lower rod end, positioned between said first and second support members, and within said first tube and said second tube;

(o) said base end of said second hydraulic cylinder being positioned between said upper ends of said first and second support members and being secured thereto;

(p) said rod end of said second hydraulic cylinder being secured to said lower end of said second tube;

(q) the extension of said second hydraulic cylinder causing said second tube to move downwardly with respect to said first tube;

(r) the retraction of said second hydraulic cylinder causing said second tube to move upwardly with respect to said first tube;

(s) a horizontally extending cross-tube, having a first end and a second end, secured to said lower end of said second tube so as to be positioned forwardly of said second tube and so that first end of said cross-tube is positioned outwardly of said first support member and so that said second end of said cross-tube is positioned outwardly of said second support member;

(t) a first clamping tube selectively horizontally movably embracing said cross-tube inwardly of said first end of said cross-tube;

(u) an elongated first gauge wheel support, having an upper end and a lower end, with said upper end of said first gauge wheel support being secured to said first mount tube whereby said first gauge wheel support extends downwardly and forwardly from said first mount tube;

(v) a first gauge wheel rotatably mounted on said lower end of said first gauge wheel support;

(w) a second clamping tube selectively horizontally movably embracing said cross-tube inwardly of said second end of said cross-tube;

(x) an elongated second gauge wheel support, having an upper end and a lower end, with said upper end of said second gauge wheel support being secured to said second mount tube whereby said second gauge wheel support extends downwardly and forwardly form said second mount tube;

(y) a second gauge wheel rotatably mounted on said lower end of said second gauge wheel support;

(z) an elongated and horizontally disposed second support having a forward end, a rearward end, a first side, a second side, an upper side and a lower side;

(aa) said forward end of elongated and horizontally disposed second support being positioned between said first and second support members of said vertically disposed first support and being secured thereto so as to extend rearwardly from said first support;

(bb) a first plate welded to the second tube with said first plate having a forward end, a rearward end, a first side and a second side;

(cc) a first pair of vertically spaced-apart parallel arms having an inner end and an outer end;

(dd) said inner end of said first pair of vertically spaced-apart parallel arms being pivotally received, about a vertical axis, to said first side of said first plate whereby said first pair of vertically spaced-apart parallel arms extend outwardly and rearwardly from said first side of said first plate;

(ee) a second pair of vertically spaced-apart parallel arms having an inner end and an outer end;

(ff) said inner end of said second pair of vertically spaced-apart parallel arms being pivotally secured, about a vertical axis, to said second side of said first plate whereby said second pair of vertically spaced-apart parallel arms extend outwardly and rearwardly from said second side of said first plate;

(gg) a third support secured to said lower side of said elongated and horizontally disposed second support and which extends downwardly from said elongated and horizontally disposed second support;

(hh) said third support having an upper end, a lower end, a first side, a second side, a forward end and a rearward end;

(ii) said third support having a horizontally disposed square opening formed therein which extends therethrough from said forward end of said third support to said rearward end of said third support;

(jj) a second plate secured to said lower end of said third support and which has a forward end, a rearward end, a first side and a second side;

(kk) a third pair of vertically spaced-apart parallel arms having an inner end and an outer end;

(ll) said inner end of said third pair of vertically spaced-apart parallel arms being pivotally secured, about a vertical axis, to said second plate;

(mm) said third pair of vertically spaced-apart parallel arms being parallel to said first pair of vertically spaced-apart parallel arms;

(nn) a fourth pair of vertically spaced-apart parallel arms having an inner end and an outer end;

(oo) said inner end of said fourth pair of vertically spaced-apart parallel arms being pivotally secured, about a vertical axis, to said second plate whereby said fourth pair of vertically spaced-apart parallel arms extend outwardly and rearwardly from said second side of said second plate;

(pp) said fourth pair of vertically spaced-apart parallel arms being parallel to said second pair of vertically spaced-apart parallel arms;

(qq) an elongated and vertically disposed first mounting plate having a forward end, a rearward end, an upper end, a lower end, an inner side and an outer side;

(rr) said outer end of said first pair of vertically spaced-apart parallel arms being pivotally secured, about a vertical axis, to said inner side of said first mounting plate at said forward end of said first mounting plate;

(ss) said outer end of said third pair of vertically spaced-apart parallel arms being pivotally secured, about a vertical axis, to said inner side of said first mounting plate at said rearward end of said first mounting plate;

(tt) an elongated and vertically disposed second mounting plate having a forward end, a rearward end, an upper end, a lower end, an inner side and an outer side;

(uu) said outer end of said second pair of vertically spaced-apart parallel arms being pivotally secured, about a vertical axis, to said inner side of said second mounting plate at said forward end of said second mounting plate;

(vv) said outer end of said fourth pair of vertically spaced-apart parallel arms being pivotally secured, about a vertical axis, to said second mounting plate at said rearward end of said second mounting plate;

(ww) an elongated and horizontally disposed connector tube, having forward and rearward ends, slidably positioned in said square opening of said third support;

(xx) a horizontally disposed and elongated first link arm having inner and outer ends;

(yy) said inner end of said first link arm being pivotally secured, about a vertical axis, to said connector tube at said forward end of said connector tube;

(zz) said first link arm extending outwardly and forwardly from said connector tube;

(aaa) said outer end of said first link arm being pivotally secured, about a vertical axis, to said first mounting plate between said forward and rearward ends of said first mounting plate;

(bbb) a horizontally disposed and elongated second link arm having inner and outer ends;

(ccc) said inner end of said second link arm being pivotally secured, about a vertical axis, to said connector tube at said forward end of said connector tube;

(ddd) said second link arm extending outwardly and forwardly from said connector tube;

(eee) said outer end of said second link arm being pivotally secured, about a vertical axis, to said second mounting plate between said forward and rearward ends of said second mounting plate;

(fff) a horizontally disposed power cylinder having a base end and a rod end with said power cylinder being movable between extended and retracted positions;

(ggg) said base end of said power cylinder being fixed to said second support;

(hhh) said rod end of said power cylinder being secured to said forward end of said connector tube whereby the extension of said power cylinder causes said connector tube to slidably move rearwardly with respect to said third support and whereby the retraction of said power cylinder causes said connector tube to slidably move forwardly with respect to said third support;

(iii) at least one ground engaging cultivator tool secured to said first mounting plate for movement therewith; and (jjj) at least one ground engaging cultivator tool secured to said second mounting plate for movement therewith.

2. The combination of claim 1 wherein said first hydraulic cylinder, said second hydraulic cylinder and said power cylinder being remotely controllable.

3. The combination of claim 1 including a tractor for pulling said tool bar and wherein said first hydraulic cylinder, said second hydraulic cylinder and said power cylinder are controllable from said tractor.

4. In combination:

a horizontally disposed and vertically movable tool bar having a first end, a second end, an upper side, a lower side, a forward side and a rearward side;

a plurality of horizontally spaced-apart cultivator row units secured to said tool bar;

each of said horizontally spaced-apart cultivator row units comprising:

(a) a support clamp selectively longitudinally clamped onto said tool bar with said support clamp having an upper end, a lower end, a forward end and a rearward end;

(b) first and second horizontally spaced-apart parallel arms having forward and rearward ends;

(c) said forward ends of said first and second horizontally spaced-apart parallel arms being pivotally secured, about a horizontal axis, to said rearward end of said clamp at said upper end thereof;

(d) a first hydraulic cylinder having a base end and a rod end;

(e) said base end of said first hydraulic cylinder being pivotally secured, about a horizontal axis, to said rearward end of said clamp at said lower end thereof;

(f) a vertically disposed first support including horizontally spaced-apart first and second support members which have an upper end, a lower end, a forward end, a rearward end, an inner side and an outer side;

(g) said rearward end of said first parallel arm being pivotally secured, about a horizontal axis, to said forward end of said first support member at said upper end of said first support member;

(h) said rearward end of said second parallel arm being pivotally secured, about a horizontal axis, to said forward end of said second support member at said upper end of said second support member;

(i) said rod end of said first hydraulic cylinder being pivotally secured, about a horizontal axis, to said forward ends of said first and second support members at said lower ends of said first and second support members;

(j) the extension of said first hydraulic cylinder causing said vertically disposed first support to move upwardly with respect to said tool bar;

(k) the retraction of said first hydraulic cylinder causing said vertically disposed first support to move downwardly with respect to said tool bar;

(l) a pair of selectively vertically movable gauge wheels operatively secured to said first support;

(m) each of said gauge wheels being selectively horizontally movable with respect to said first support;

(n) an elongated and horizontally disposed second support having a forward end, a rearward end, a first side, a second side, an upper side and a lower side;

(o) said second support extending rearwardly from said first support;

(p) a first plate welded to the second tube with said first plate having a forward end, a rearward end, a first side and a second side;

(q) a first pair of vertically spaced-apart parallel arms having an inner end and an outer end;

(r) said inner end of said first pair of vertically spaced-apart parallel arms being pivotally secured, about a vertical axis, to said first side of said first plate whereby said first pair of vertically spaced-apart parallel arms extend outwardly and rearwardly from said first side of said first plate;

(s) a second pair of vertically spaced-apart parallel arms having an inner end and an outer end;

(t) said inner end of said second pair of vertically spaced-apart parallel arms being pivotally secured, about a vertical axis, to said second side of said first plate whereby said second pair of vertically spaced-apart parallel arms extend outwardly and rearwardly from said second side of said first plate;

(u) a third support secured to said lower side of said elongated and horizontally disposed second support and which extends downwardly from said elongated and horizontally disposed second support;

(v) said third support having an upper end, a lower end, a first side, a second side, a forward end and a rearward end;

(w) said third support having a horizontally disposed square opening formed therein which extends therethrough from said forward end of said third support to said rearward end of said third support;

(x) a second plate secured to said lower end of said third support and which has a forward end, a rearward end, a first side and a second side;

(y) a third pair of vertically spaced-apart parallel arms having an inner end and an outer end;

(z) said inner end of said third pair of vertically spaced-apart parallel arms being pivotally secured, about a vertical axis, to said second plate;

(aa) said third pair of vertically spaced-apart parallel arms being parallel to said first pair of vertically spaced-apart parallel arms;

(bb) a fourth pair of vertically spaced-apart parallel arms having an inner end and an outer end;

(cc) said inner end of said fourth pair of vertically spaced-apart parallel arms being pivotally secured, about a vertical axis, to said second plate whereby said fourth pair of vertically spaced-apart parallel arms extend outwardly and rearwardly from said second side of said second plate;

(dd) said fourth pair of vertically spaced-apart parallel arms being parallel to said second pair of vertically spaced-apart parallel arms;

(ee) an elongated and vertically disposed first mounting plate having a forward end, a rearward end, an upper end, a lower end, an inner side and an outer side;

(ff) said outer end of said first pair of vertically spaced-apart parallel arms being pivotally secured, about a vertical axis, to said inner side of said first mounting plate at said forward end of said first mounting plate;

(gg) said outer end of said third pair of vertically spaced-apart parallel arms being pivotally secured, about a vertical axis, to said inner side of said first mounting plate at said rearward end of said first mounting plate;

(hh) an elongated and vertically disposed second mounting plate having a forward end, a rearward end, an upper end, a lower end, an inner side and an outer side;

(ii) said outer end of said second pair of vertically spaced-apart parallel arms being pivotally secured, about a vertical axis, to said inner side of said second mounting plate at said forward end of said second mounting plate;

(jj) said outer end of said fourth pair of vertically spaced-apart parallel arms being pivotally secured, about a vertical axis, to said second mounting plate at said rearward end of said second mounting plate;

(kk) an elongated and horizontally disposed connector tube, having forward and rearward ends, slidably positioned in said square opening of said third support;

(ll) a horizontally disposed and elongated first link arm having inner and outer ends;

(mm) said inner end of said first link arm being pivotally secured, about a vertical axis, to said connector tube at said forward end of said connector tube;

(nn) said first link arm extending outwardly and forwardly from said connector tube;

(oo) said outer end of said first link arm being pivotally secured, about a vertical axis, to said first mounting plate between said forward and rearward ends of said first mounting plate;

(pp) a horizontally disposed and elongated second link arm having inner and outer ends;

(qq) said inner end of said second link arm being pivotally secured, about a vertical axis, to said connector tube at said forward end of said connector tube;

(rr) said second link arm extending outwardly and forwardly from said connector tube;

(ss) said outer end of said second link arm being pivotally secured, about a vertical axis, to said second mounting plate between said forward and rearward ends of said second mounting plate;

(tt) a horizontally disposed power cylinder having a base end and a rod end with said power cylinder being movable between extended and retracted positions;

(uu) said base end of said power cylinder being fixed to said second support;

(vv) said rod end of said power cylinder being secured to said forward end of said connector tube whereby the extension of said rod end thereof causes said connector tube to slidably move rearwardly with respect to said third support and whereby the retraction of said power cylinder causes said connector tube to slidably move forwardly with respect to said third support;

(ww) at least one ground engaging cultivator tool secured to said first mounting plate for movement therewith; and (xx) at least one ground engaging cultivator tool secured to said second mounting plate for movement therewith.

5. The combination of claim 4 wherein said first hydraulic cylinder and said power cylinder being remotely controllable.

6. The combination of claim 4 including a tractor for pulling said tool bar and wherein said first hydraulic cylinder and said power cylinder are controllable from said tractor.

* * * * *